(12) United States Patent
Oh

(10) Patent No.: US 6,334,264 B1
(45) Date of Patent: Jan. 1, 2002

(54) FIXATION METHOD OF HINGE POINT OF TAILGATE FOR AUTOMOBILE

(75) Inventor: Joo-Tae Oh, Suwon-shi (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/474,803

(22) Filed: Dec. 29, 1999

(30) Foreign Application Priority Data

Oct. 4, 1999 (KR) .............................................. 99-42625

(51) Int. Cl.$^7$ ................................................ G01D 21/00
(52) U.S. Cl. .......................... 33/613; 33/645; 29/281.5; 29/464; 29/468
(58) Field of Search .............................. 29/11, 464, 468, 29/281.1, 281.5; 296/56, 146.8, 106; 33/600, 613, 645

(56) References Cited

U.S. PATENT DOCUMENTS

| | | | |
|---|---|---|---|
| 4,186,476 A | * 2/1980 | Mair et al. | 29/407 |
| 4,688,844 A | * 8/1987 | Hirose et al. | 296/76 |
| 4,790,047 A | * 12/1988 | Myslicki | 16/386 |
| 4,989,313 A | * 2/1991 | Dzurko et al. | 29/281.4 |
| 5,282,305 A | * 2/1994 | Nutt et al. | 29/468 |
| 5,694,675 A | * 12/1997 | Pasternak et al. | 29/468 |
| 5,979,952 A | * 11/1999 | Dering et al. | 292/341.18 |
| 6,006,635 A | * 12/1999 | Stojkovic et al. | 81/484 |
| 6,007,133 A | * 12/1999 | Heim et al. | 296/56 |
| 6,007,139 A | * 12/1999 | Shave | 296/146.8 |
| 6,029,335 A | * 2/2000 | Hui et al. | 29/464 |
| 6,038,738 A | * 3/2000 | Neag et al. | 165/324 |
| 6,073,330 A | * 6/2000 | Roy | 29/281.5 |
| 6,098,265 A | * 8/2000 | Stojkovic et al. | 29/464 |
| 6,101,706 A | * 8/2000 | Roy | 29/714 |
| 6,122,809 A | * 9/2000 | Roy | 29/239 |
| 6,122,813 A | * 9/2000 | Roy et al. | 29/407.09 |
| 6,122,819 A | * 9/2000 | Roy et al. | 29/714 |

FOREIGN PATENT DOCUMENTS

JP     0121925   *   5/1991   .................. 296/106

* cited by examiner

Primary Examiner—S. Thomas Hughes
Assistant Examiner—Essama Omgba

(57) ABSTRACT

A fixation method of a hinge point of a tailgate for an automobile adapted to improve a difficulty of fixing a hinge point due to a difference between a central roof panel and a hinge point of an outer block when a tailgate is mounted. The method of a hinge point of a tailgate for an automobile enables fixation within a short period of time and to preclude interference from a tailgate parting line and a roof panel parting line. The method comprises the steps of: drawing line segments G1 and G2 each detached at a predetermined distance from a central parting line P1 of the roof panel and fixing a circle C1 having the same curvature as the curvature R of the central parting line P1 so as to define G1 as a tangent; fixing the circle C1 to seek a cross point I1 with the line G2 and fixing a straight line segment L1 connecting the cross point I1 with a parting line P2 of the tailgate; fixing a circle C2 designating the straight line segment L1 as a diameter; and fixing a straight line segment L2 dividing and orthogonally crossing the circle C2 and the straight line segment L1 to fix a cross point I2 with the circle C2 at the tailgate side and to fix the cross point I2 as a hinge point.

2 Claims, 8 Drawing Sheets

FIXATION METHOD OF HINGE POINT OF TAILGATE FOR AUTOMOBILE

BACKGROUND OF THE INVENTION

1. Field of the Invention

The present invention relates to a fixation method of a hinge point of a tailgate for an automobile, and more particularly to a fixation method of a hinge point of a tailgate for an automobile adapted to improve a difficulty of fixing a hinge point due to a difference between a central roof panel and a hinge point of an outer block when a tailgate is mounted.

2. Description of the Prior Art

Generally, a vehicle is mounted with a plurality of doors openable and closeable for loading and unloading and in case of a one-box car such as a jeep, one-ton a van, etc., a tailgate is arranged at a rear side thereof for loading and unloading of cargoes.

The tailgate is hinged, as illustrated in FIGS. 2 and 3, to a left hinge H' and a right hinge H" about a central line C of roof panel R for possible rotation.

The roof panel R of the vehicle forms a predetermined shape of curvature, and due to a difference of central mounting position between the left hinge H' and the right hinge H", a rotating center for the hinges H' and H" should be fixed and interference from the roof panel R should be precluded when a tailgate T is rotated.

At this point, the left hinge H' indicated in a dotted line in FIG. 3 is to fix a hinge positioned in the left elevation, as projected on a central line position for the convenience of illustration.

Now, a fixing method of hinge point for the tailgate T will be described. When a parting line for the roof line R and the tailgate T is determined at a design stage which is an initial development state of a vehicle, a design part seeks a hinge point of the tailgate T. At this time, a worker imaginarily fixes an imaginary hinge point and simulates thereon.

When the simulation is performed, checks are made into whether or not there exists an interference of parting line of the roof panel R and the tailgate T, state of gap set-up, etc., and if the interference occurs, the hinge point is changed to repeat the simulation.

Of course, while a designer of the tailgate T repeats the above-mentioned simulation, a roof panel designer should wait for the completion of the work by the designer of tailgate T, not performing the design of the roof panel R.

SUMMARY OF THE INVENTION

However, there is a problem in that, when a hinge point of a tailgate is designed as mentioned above, and if a random point is set up to simulate rotation of the tailgate and the like and to check the interference, state of gap set-up and the like, and above-mentioned processes are repeated until above mentioned respective values reach points within design values, operation rates are decreased dramatically.

Furthermore, a hinge point design efficiency of the tailgate becomes very low, a design operation of roof panel where the above mentioned hinge point is situated is delayed, to thereby decrease the entire design efficiency of a vehicle.

The present invention is provided to solve the aforementioned problems and it is an object of the present invention to provide a fixation method of a hinge point of a tailgate for an automobile adapted to fix a hinge point of a tailgate for an automobile within a fast period of time and to rule out an interference from a tailgate parting line and a roof panel parting line.

In accordance with the objects of the present invention, there is provided a fixation method of a hinge point of a tailgate for an automobile, the method comprising the steps of:

drawing line segments G1 and G2, each detached at a predetermined distance from a central parting line P1 of the roof panel, and fixing a circle C1 having the same curvature as the curvature R of the central parting line P1 so as to define G1 as tangent;

fixing the circle C1 to seek a cross point I1 with the line G2 and fixing a straight line segment L1 connecting the cross point I1 with a parting line P2 of the tailgate;

fixing a circle C2 designating the straight line segment L1 as diameter; and fixing a straight line segment L2 dividing and orthogonally crossing the circle C2 and the straight line segment L1 to fix a cross point I2 with the circle C2 at the tailgate side and to fix the cross point I2 as a hinge point.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1A:
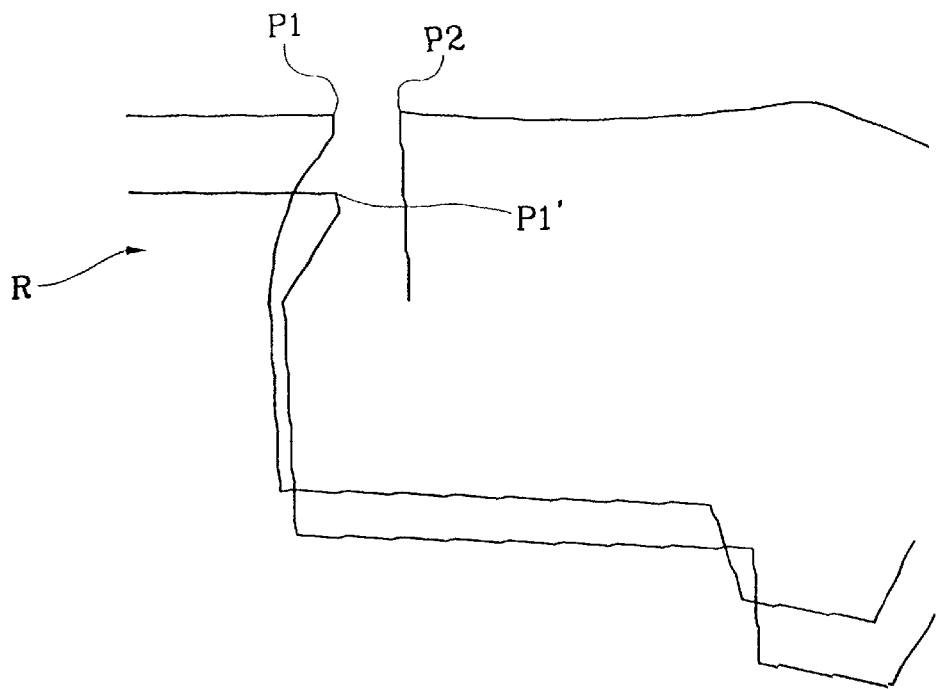
FIG. 1a is a constitutional diagram for illustrating states of roof panel parting lines P1 and P1' and a tailgate parting line P2 in the fixation method of a hinge point of a tailgate for an automobile according to the present invention.

FIGS. 1*a* through 1*k* are constitutional diagrams for illustrating sequences of a fixation method of a hinge point of a tailgate for an automobile according to the present invention, where FIG. 1*a* shows an arranged state of a central parting line P1 of roof panel R, a parting line P1' at an outer block and a parting line P2 of the tailgate T.

Figure 1B:
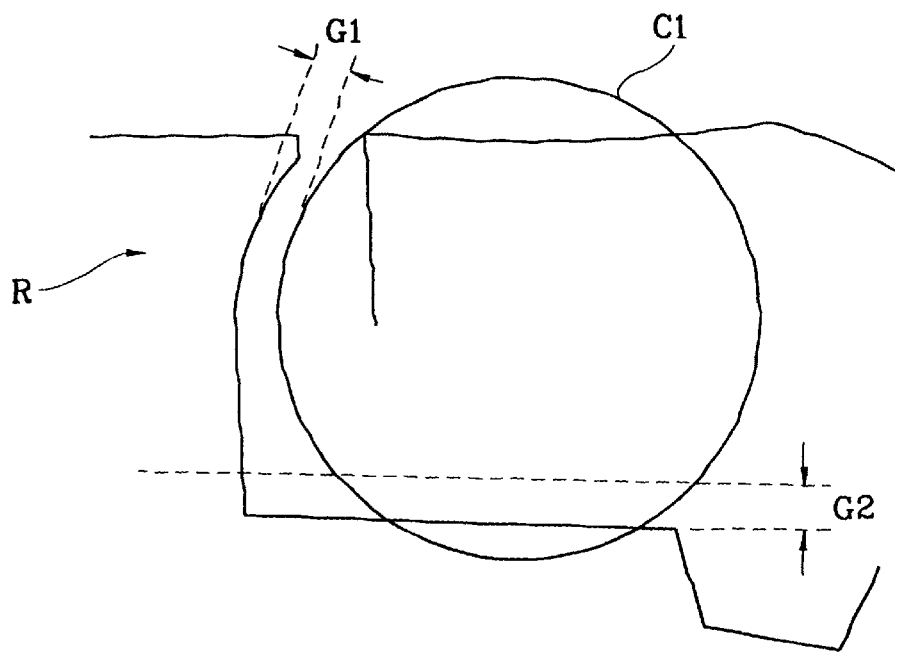
FIG. 1b is a constitutional diagram for illustrating a state where a circle C1 detached at a predetermined gap is drawn by a curvature of the roof panel parting line P1 centrally positioned at the roof panel in FIG. 1a and allowable detached distances G1 and G2 are drawn.
Figure 1C:
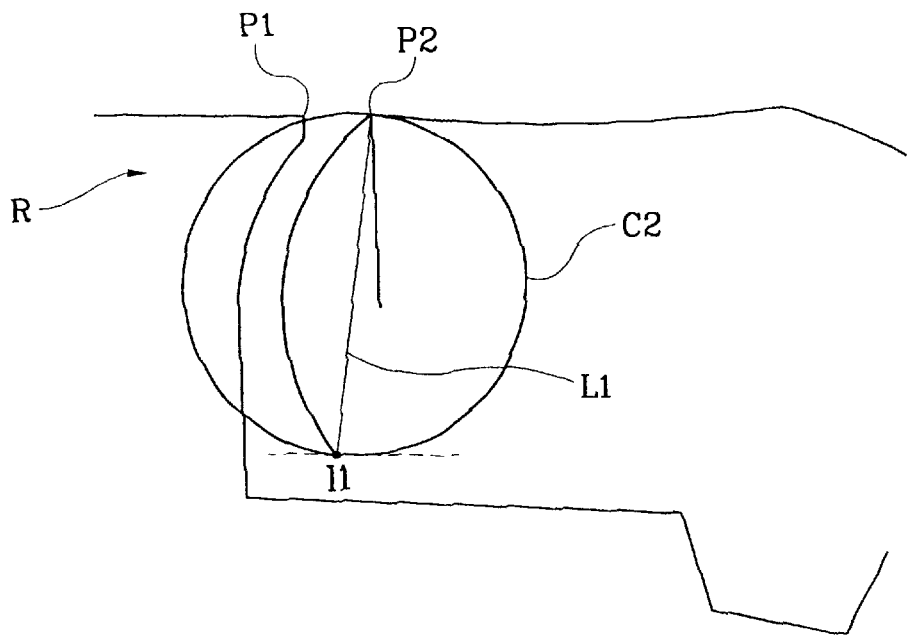
FIG. 1c is a constitutional diagram for illustrating a circle C2 designating a diameter between the tailgate parting line P2 and a cross point I1 between the circle C1 in FIG. 1b and the line segment G2.

In order to find a position of a hinge point of the tailgate T under this state, line segments G1 and G2 each detached at a predetermined distance (approximately 6 mm and 5 mm) from the central parting line P1 of the roof panel R are drawn, and a circle C1 having the same curvature as the curvature R of the central parting line segment P1 on line G1 is drawn, as illustrated in FIG. 1*b*. As illustrated in FIG. 1*c*, circle C1 is drawn to seek a cross point I1 between the circle C1 and line segment G2, and a straight line L1 connecting the parting line P2 of the tailgate T and the cross point I1.

Figure 1D:
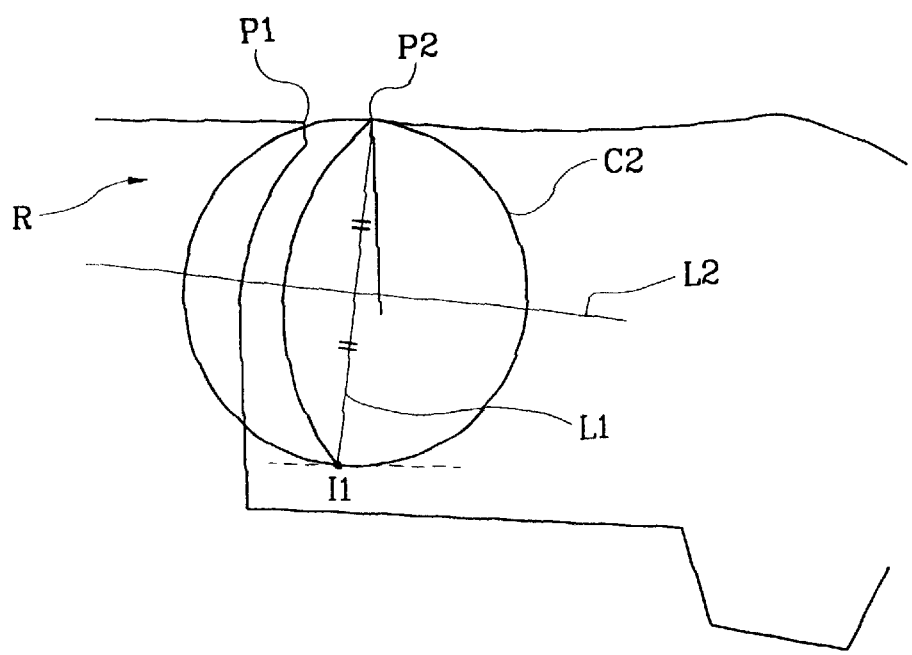
FIG. 1d is a constitutional diagram for illustrating a straight line L2 bisecting a line L1 connecting the cross point I1 and the tailgate parting line P2.

The straight line segment L1 is drawn and a circle C2 having the straight line L1 as diameter thereof is drawn, and the straight line segment L1 is bisected as shown in FIG. 1*d* and a straight line segment L2 perpendicularly crossing the straight line L1 is drawn.

Figure 1E:
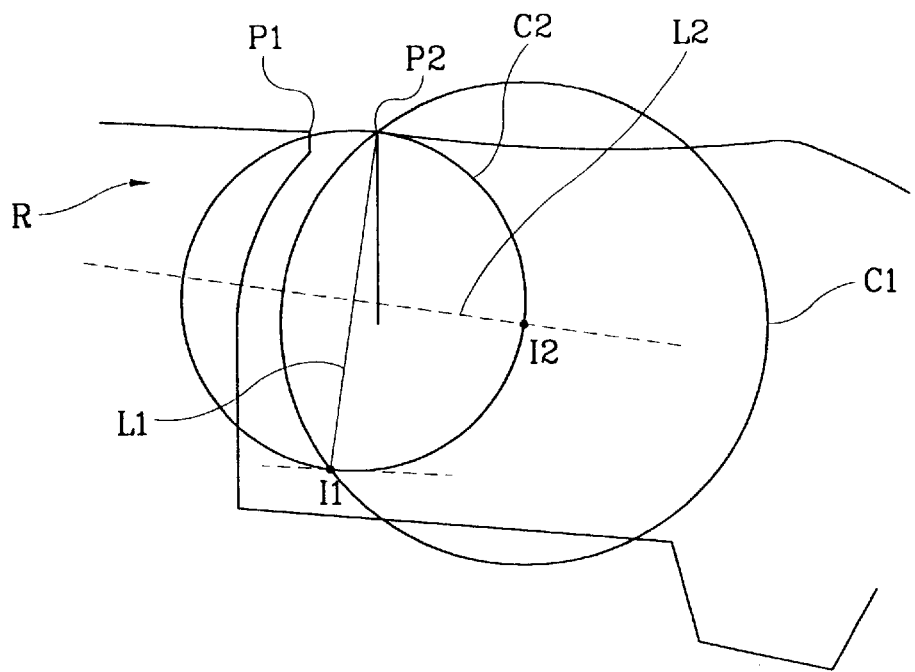
FIG. 1e is a constitutional diagram for illustrating a cross point I2 between the circle C2 in FIG. 1d and a straight line segment L2 and illustrating a circle C3 about the cross point I2.

A cross point I2 with the circle C2 is sought after the straight line segment L2 is drawn as illustrated in FIG. 1*e*, where the cross point I2 becomes a central rotary point for rotating the tailgate T to a 90-degree at a state satisfying clearance of line segments G1 and G2.

After the central rotary point I2 is sought, an interference region is sought among the tailgate parting line P2, the central parting line P1 of roof panel R and the parting line P1 at an outer block to optimize shapes of the hinges H' and H".

Figure 1F:
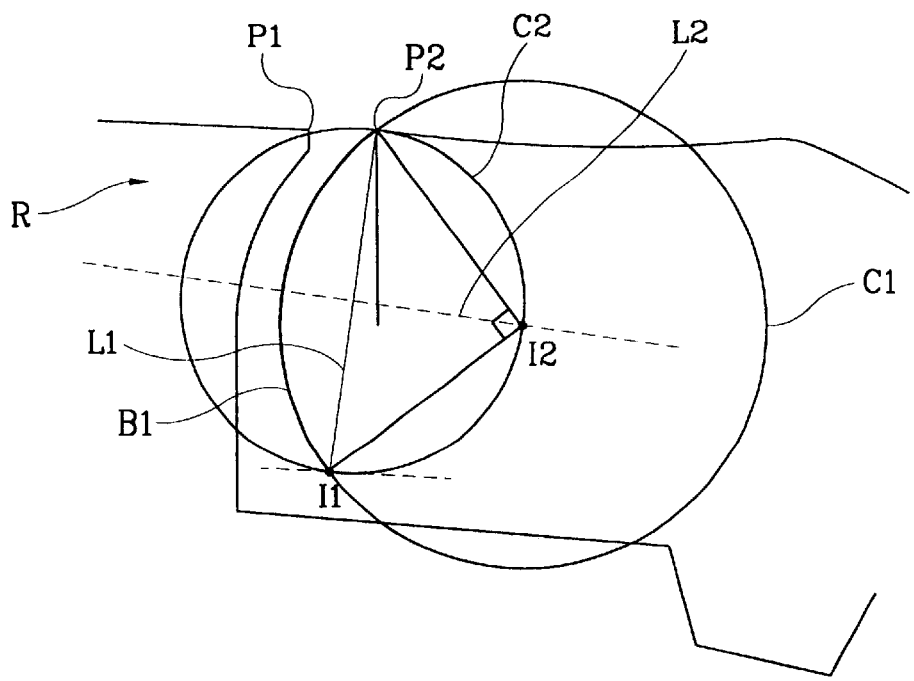
FIG. 1f is a constitutional diagram for illustrating a state connected via a straight line between the parting line P2 in FIG. 1e and cross points I1 and I2.
Figure 1G:
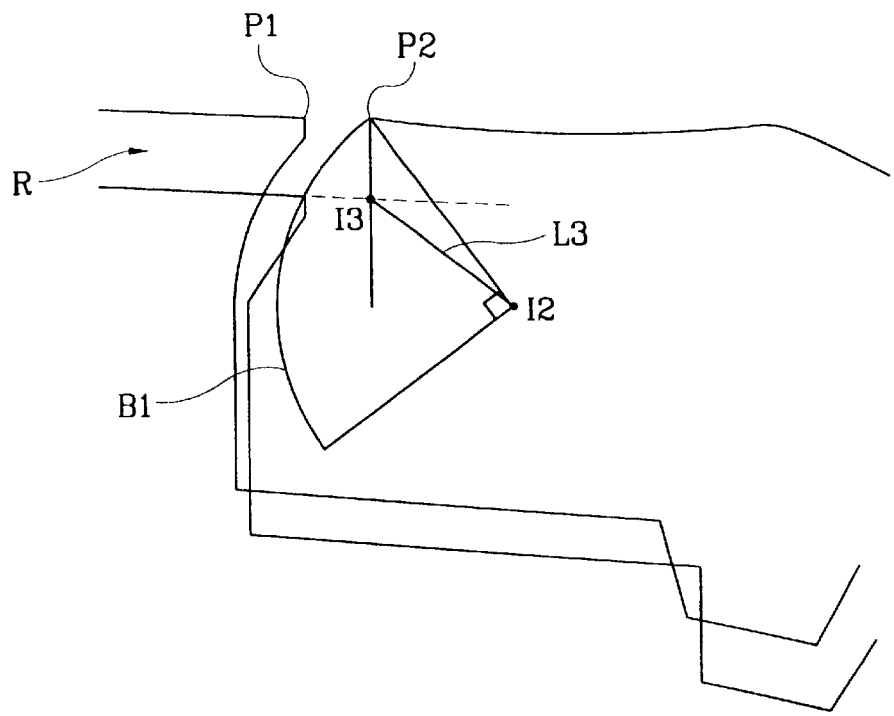
FIG. 1g is a constitutional diagram for illustrating a state connected by a straight line L3 between the cross point I2 and a cross point I3 meeting an extension line of the parting line P1' positioned at an outer block of the roof panel and a vertical line extended from the tailgate parting line P2.

In other words, a circular arc B1 is drawn as shown in FIG. 1*f* and a cross point I3 between a vertical line at the parting line P2 of tailgate T and an extension line at the parting line P1' at the outer block is sought as shown in FIG. 1*g* and a straight line segment L3 by connecting the cross point I3 and another cross point I2 is obtained.

Figure 1H:
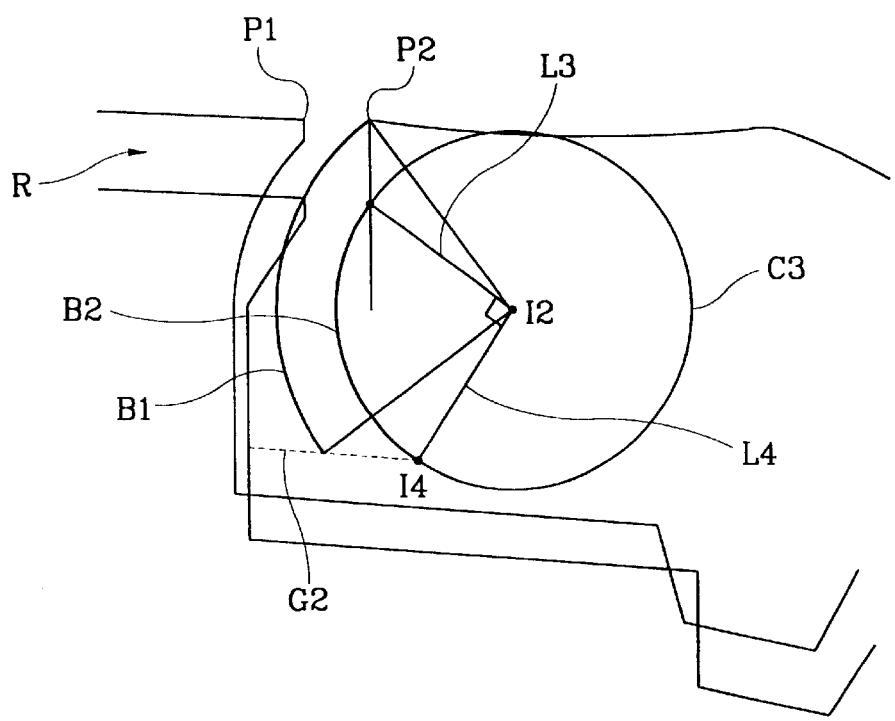
FIG. 1h is a constitutional diagram for illustrating a cross point I4 with line segment G2 by drawing the circle C3 defining a straight line segment L3 as a radius in FIG. 1g.
Figure 1I:
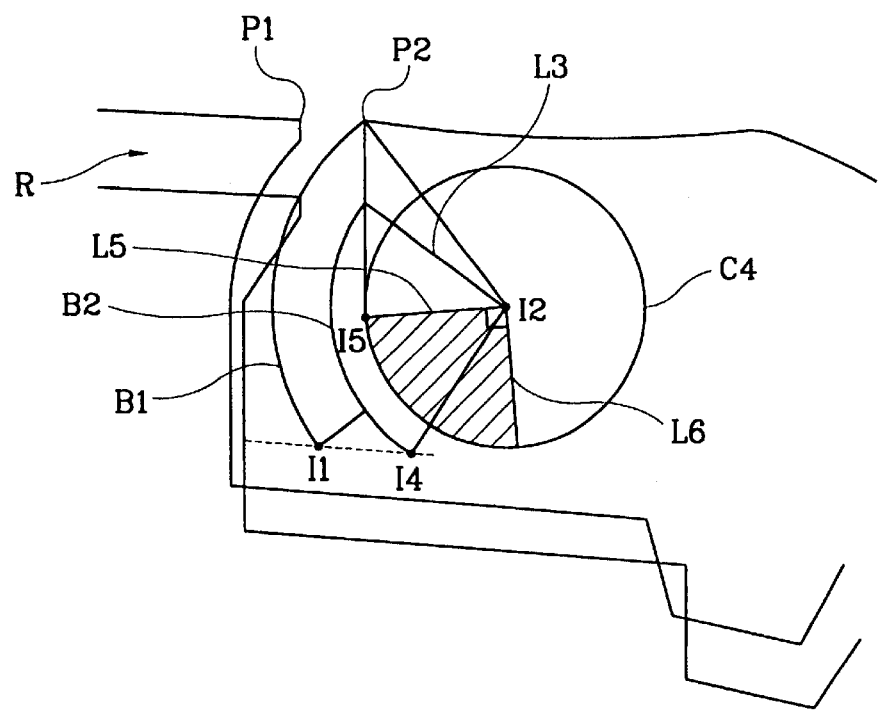
FIG. 1i is a constitutional diagram for illustrating a state where a vertical line longitudinal point I5 at the parting line P2 in FIG. 1h and the cross point I2 are connected by a straight line segment L4 and a circle C4 is drawn with the straight line segment L4 and a circle C4 is drawn with the straight line segment L4 as diameter and a straight line segment L5 perpendicular thereto is drawn to seek a cross point I6 with a circle C4.

When the straight line segment L3 is obtained, a circle C3 having L3 as radius is drawn as shown in FIG. 1*h* and a straight line L4 positioned at right angle counterclockwise relative to the straight line segment L3 is depicted. A cross point I4 between the circle C3 and the straight line segment L4 is sought to obtain a circle B2.

After the circular arc B2 is obtained, the cross point I2 and a lower end I5 of vertical line at the parting line P2 are connected to obtain a straight line segment L5. A circle C4 having the straight line segment L5 as radius is drawn and a straight line segment L6 positioned at a right angle relative to the straight line L5 is drawn to obtain a cross point I6 with the circle C4.

Figure 1J:
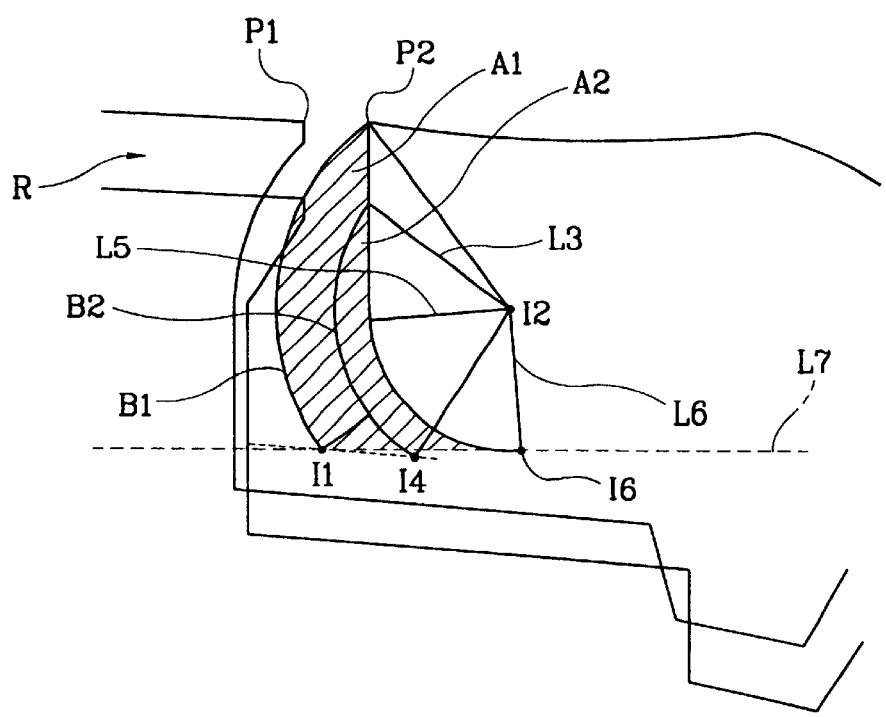
FIG. 1*j* is a constitutional diagram for illustrating a state where a straight line L7 connects cross points I1 and I6 in FIG. 1*i* to thereby depict an interference region; a line L6 connects point I2 to point I6 on line L7.
Figure 1K:
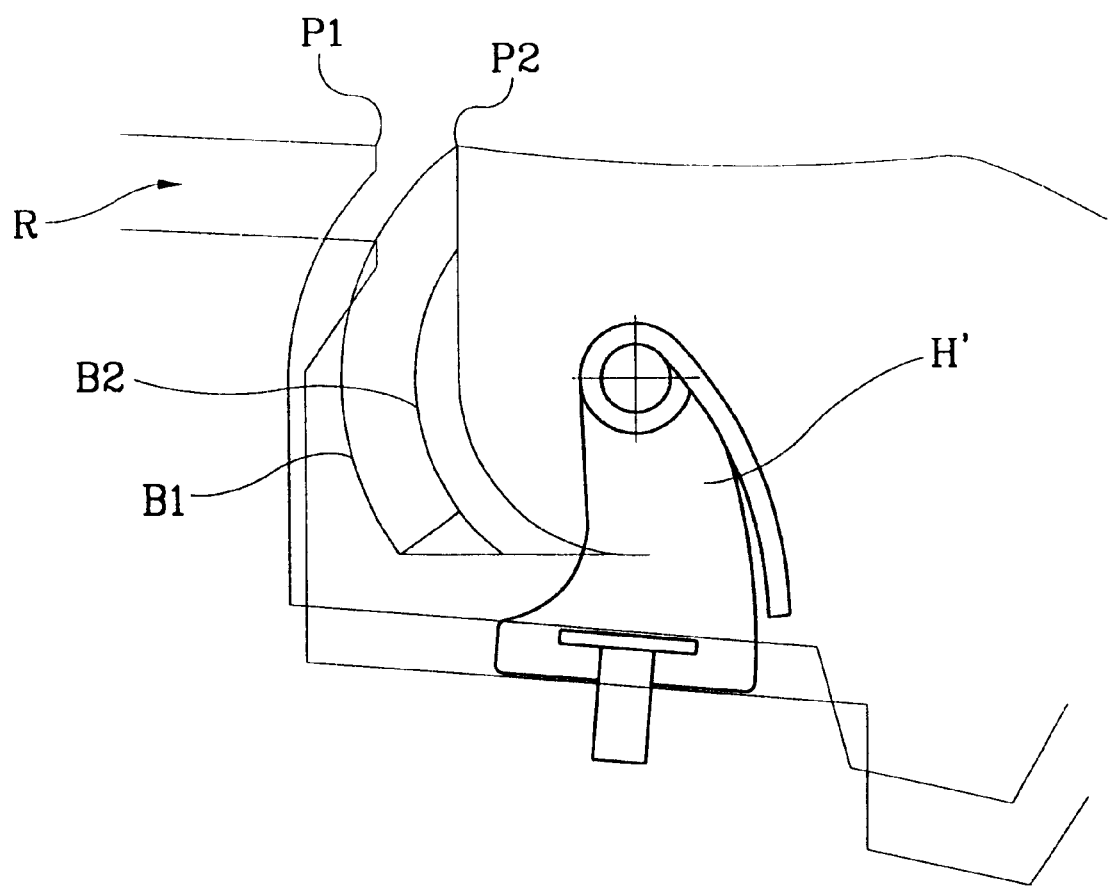
FIG. 1*k* is a constitutional diagram for illustrating a state where a hinge is fixed in FIG. 1*j*.
Figure 2:
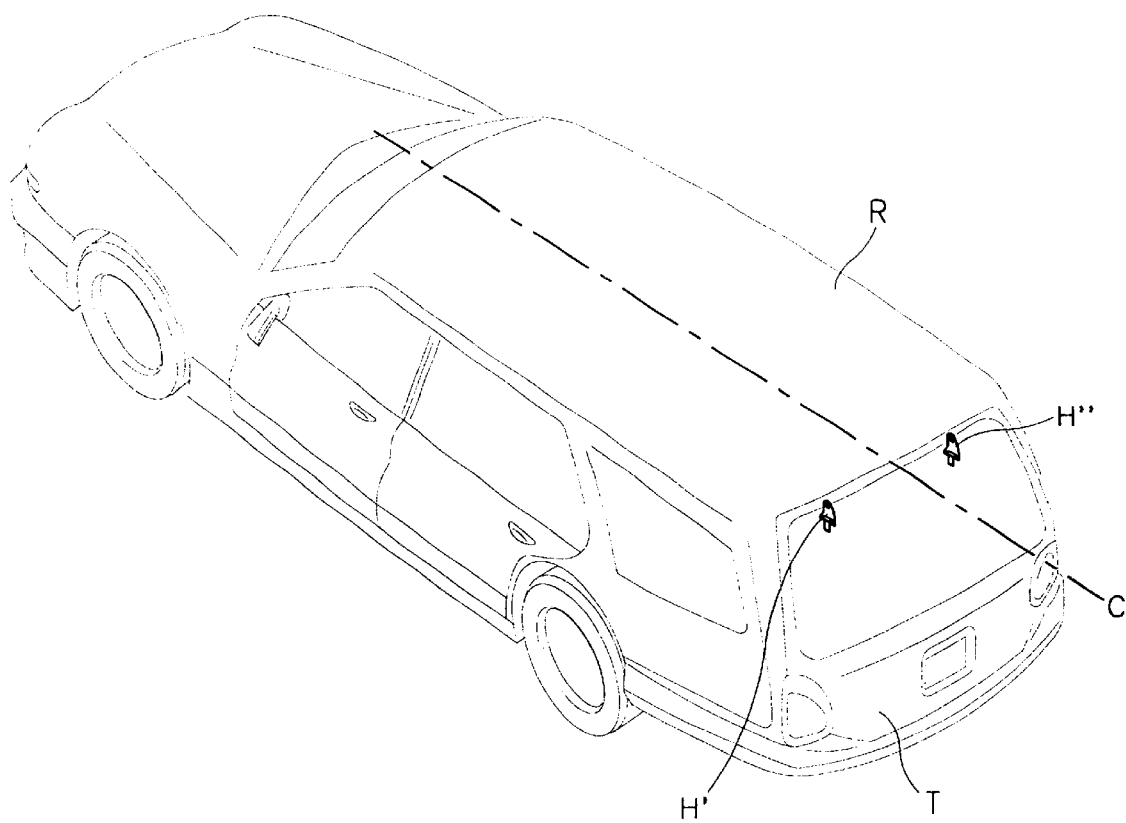
FIG. 2 is a schematic diagram for illustrating a fixed state of a hinge in a vehicle mounted with a tailgate according to the prior art.
Figure 3:
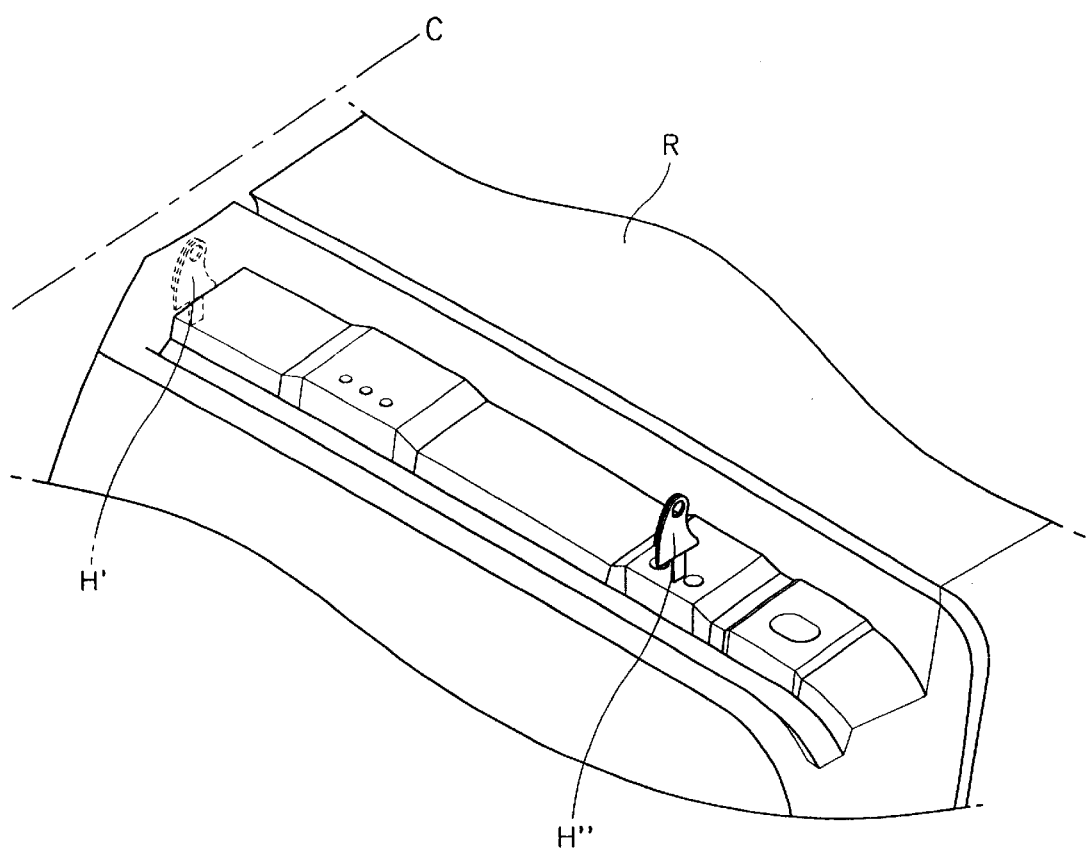
FIG. 3 is a schematic diagram for illustrating a state where a left hinge is projected at a central portion and a hinge is fixed at a right portion.

When a straight line segment L7 connecting the cross points I1, I4 and I6 is obtained as illustrated in FIG. 1*j* to consequently obtain interference regions of a central hinge and a hinge at an outer block A1 and A2, hinges H' and H" are manufactured to prevent interference as illustrated in FIG. 1*k*.

As mentioned, when the hinge point I2 where the tailgate T is rotated about the hinges H' and H" are obtained and interference regions caused by rotation of the tailgate T are obtained, installation of tailgate T can be realized by just one hinge mounting operation and simultaneously shapes of hinges H' and H" which are not interfered by rotary movement of the tailgate T can be obtained, such that design work efficiency of tailgate T a roof panel R can be improved.

In other words, interference from the hinges H' and H" and the tailgate T can be prevented by bending each portion of the hinges H' and H" as much as the detached distance obtained at FIG. 1*k*. Of course, when the tailgate T is rotated by the cross point I2 which is a rotary center of the tailgate T thus obtained, an interference can be ruled out under a state minimizing a gap from the roof panel parting lines P1 and P1'.

As apparent from the foregoing, there is an advantage in the fixation method of hinge point of tailgate for automobile according to the present invention in that a gap between a central parting line of roof panel, a parting line at an outer block and a parting line of tailgate can be minimized to thereby fix a hinge point just by one fixing operation.

What is claimed is:

1. A fixation method of a hinge point of a tailgate for an automobile, the method comprising the steps of:

drawing line segments G1 and G2, each detached at a predetermined distance from a central parting curved line P1 of a roof panel and fixing a circle C1 having a same curvature as a curvature R of the central parting curved line P11 so as to define line segment G1 as a tangent;

fixing the circle C1 to seek a cross point I1 with the line segment G2 and fixing a straight line segment L1 connecting the cross point I1 with a parting line P2 of the tailgate;

fixing a circle C2 designating the straight line segment L1 as a diameter; and fixing a straight line segment L2 dividing and orthogonally crossing the circle C2 and the straight line segment L1 to fix a cross point I2 with the circle C2 at the tailgate side and to fix the cross point I2 as a hinge point.

2. The method as defined in claim 1, further comprising the steps of:

fixing the circular arc B1 formed between a circle C1 and the straight line segment L1 in order to obtain a rotary interference region of the tailgate according to the hinge point;

obtaining a cross point I3 between an extension line from a parting line P1' at an outer block and a vertical straight line from a tailgate parting line P2 to connect the cross point I3 with cross point I2, thereby fixing a straight line segment L3;

obtaining a circle C3 designating the straight line segment L3 as a radius thereof and drawing a straight line segment L4 counterclockwise at a right angle with the straight line segment L3 and obtaining a cross point I4 between the circle C3 and the straight line segment L4 to fix a circular arc B2;

fixing the circular arc B2 to connect the cross point I2 with a lower end I5 of vertical straight line segment of the tailgate parting line P2 and to obtain a straight line segment L5 and drawing a circle C4 having the straight line segment L5 as a radius thereof;

obtaining a straight line segment L6 which is at a right angle with the straight line segment L5 to fix a cross point I6 with the circle C4; and obtaining a straight line segment connecting the cross points I1 and I6 to fix interference regions A1 and A2 of a central hinge portion and the hinge at an outer block.

* * * * *